June 30, 1959    T. BACKUS ET AL    2,892,358
MULTI SPEED, LEVER CONTROLLED TRANSMISSION
Filed Dec. 5, 1955    4 Sheets-Sheet 2
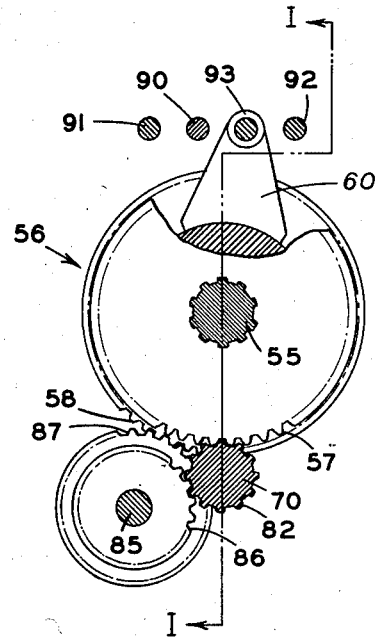
fig. 2
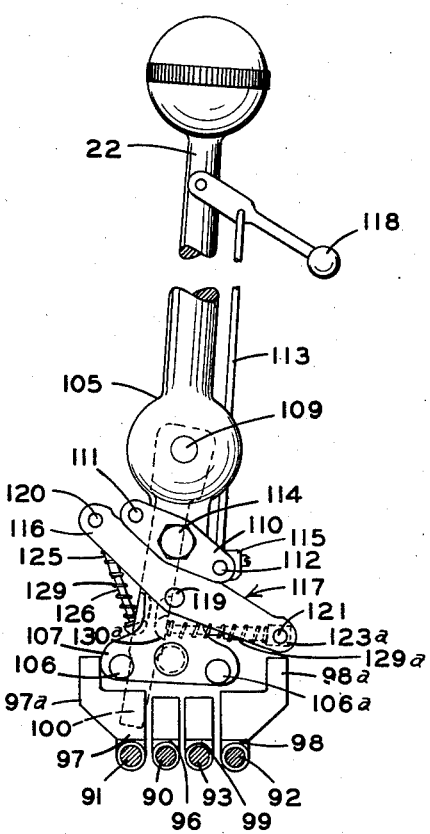
fig. 3
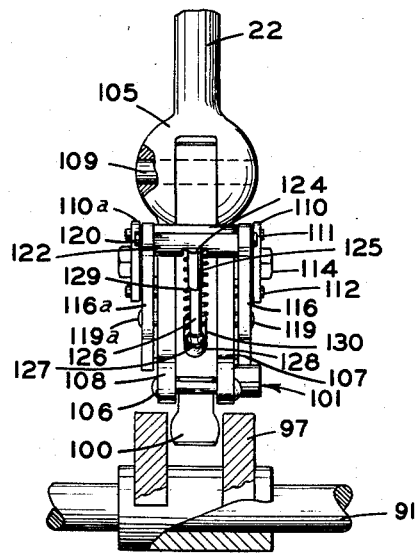
fig. 6
INVENTORS
THOMAS BACKUS
CHARLES M. PERKINS
BY
ATTORNEY June 30, 1959  T. BACKUS ET AL  2,892,358
MULTI SPEED, LEVER CONTROLLED TRANSMISSION
Filed Dec. 5, 1955  4 Sheets-Sheet 3

INVENTORS
THOMAS BACKUS
CHARLES M. PERKINS
BY
ATTORNEY

June 30, 1959  T. BACKUS ET AL  2,892,358
MULTI SPEED, LEVER CONTROLLED TRANSMISSION
Filed Dec. 5, 1955  4 Sheets-Sheet 4
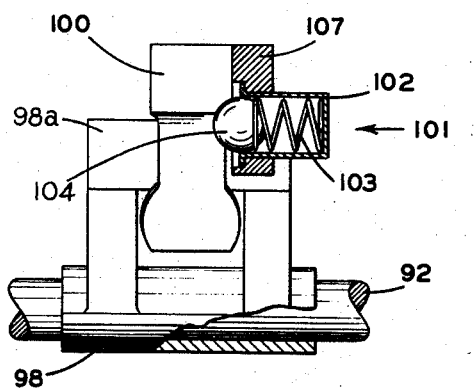
fig. 9
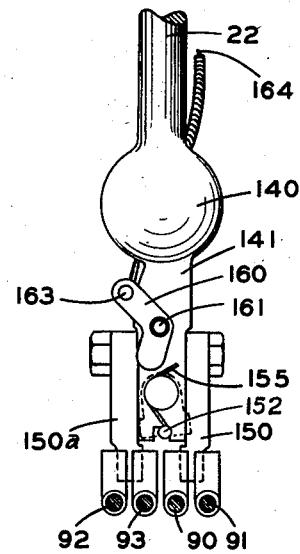
fig. 11
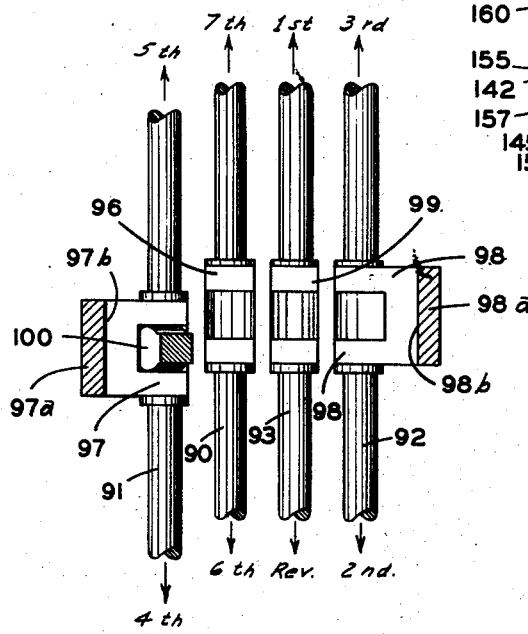
fig. 10
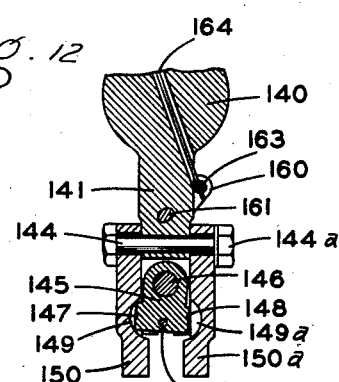
fig. 12
fig. 13
INVENTORS
THOMAS BACKUS
CHARLES M. PERKINS
BY
ATTORNEY.

United States Patent Office 2,892,358
Patented June 30, 1959

2,892,358

MULTI SPEED, LEVER CONTROLLED TRANSMISSION

Thomas Backus and Charles M. Perkins, Kalamazoo, Mich., assignors, by mesne assignments, to Fuller Manufacturing Company, a corporation of Delaware Application December 5, 1955, Serial No. 551,056

29 Claims. (Cl. 74—473)

This invention relates to an improved transmission mechanism for motor vehicles and, more particularly, to an improved transmission having a large number of gear ratios which gear ratios can be selected by a single shift lever following a simple shift pattern.

As discussed in detail in United States Patent No. 2,637,221, patented May 5, 1953, heavy vehicles, such as trucks, usually employ transmissions having a large number of gear ratios in order to obtain maximum performance and efficiency from the engine under all conditions of operation. Numerous attempts were made prior to the aforementioned patent to provide transmissions having a large number of gear ratios, but such transmissions were not completely satisfactory, either because two or more shift levers were required to effect the necessary changes in gear ratios or the shift pattern for a single shift lever has been undesirably complicated. In either event, successful manipulation of such transmissions has required the careful attention of a highly skilled driver and even highly skilled drivers cannot always operate such transmissions in a completely satisfactory manner.

The transmission structure disclosed in the aforementioned patent represents one of the first commercially successful transmissions having a large number of gear ratios manipulatable by use of a single shift lever actuable through a simple shift pattern. The transmission disclosed in the aforementioned patent employs, in general, a main transmission shiftable through one-half of the total available gear ratios of the main transmission (or a selected portion thereof, such as all of the gears excepting an overdrive ratio), and an auxiliary transmission connected between the output shaft of the main transmission and the propeller shaft and shiftable between a reduction and direct driving engagement. In the upshift progression, the main transmission is first shifted through the lower half of the selected ratio range of the transmission with the auxiliary transmission in reduction drive. The auxiliary transmission is then shifted to its direct drive position and the main transmission is shifted, using the same shift pattern, through the upper half of the selected ratio range of the transmission. The downshift progression is the reverse of that just mentioned. As described in detail in this patent, shifting of the auxiliary transmission between its two positions in either an upshift or a downshift progression may be effected by a hydraulic piston and cylinder arrangement actuable by suitable electrical, pressure fluid and/or mechanical controls and energized only when the transmission attains a predetermined position, e.g., neutral.

While this construction is effective in operation, the cost of the hydraulic piston and cylinder arrangement, and the controls therefor, is relatively fixed and, particularly with the smaller transmissions, represents a large percentage of the total cost of the transmission. Thus, the market for transmissions employing the principles set forth in the aforementioned patent has been limited, particularly in the smaller sizes of transmissions, because of the relatively high cost thereof. Thus, it is highly desirable to provide a transmission capable of performing the same functions, without the use of these relatively complicated and expensive controls and actuators for the auxiliary transmission.

Accordingly, it is an object of this invention to provide an improved transmission, primarily for use in motor vehicles, which has a relatively large number of gear ratios and in which the shift lever moves through a simple shift pattern.

It is a further object of this invention to provide an improved transmission, as aforesaid, in which the gear ratios are divided into groups, preferably two, and the shift pattern for each of the groups is, at least in major part, the same.

It is a further object of this invention to provide an improved transmission, as aforesaid, wherein the shift lever is, upon preselection by the operator, automatically moved from engagement with the shift rods controlling one group of gear ratios to the shift rods controlling another group when the transmission enters into neutral position.

A further object of the invention is to provide an improved transmission, as aforesaid, in which the necessary lateral movement of the upper end of the shift lever is materially less than is presently required for transmissions having three or more shift rods.

Other objects and advantages of this invention will become apparent to those with knowledge of equipment of this type upon reading the following description and inspecting the accompanying drawings, in which:

Figure 2 is a sectional view taken along the line II—II of Figure 1.

Figure 3 is a sectional view taken along the line III—III of Figure 1.

Figure 6 is a broken, side elevation view of the mechanism appearing in Figures 3, 4 and 5.

Figure 9 is a sectional view taken along the line IX—IX of Figure 5.

Figure 10 is a sectional view taken along the line X—X of Figure 4 and indicates the direction of movement of the shift rods for placing the transmission in the respective speeds thereof.

Figure 11 is a view of the structure of Figure 7 taken from the opposite end.

Figure 12 is a sectional view taken on line XII—XII of Figure 7.

Figure 13 is a sectional view taken on line XIII—XIII of Figure 8.

*General description*

Figure 1:
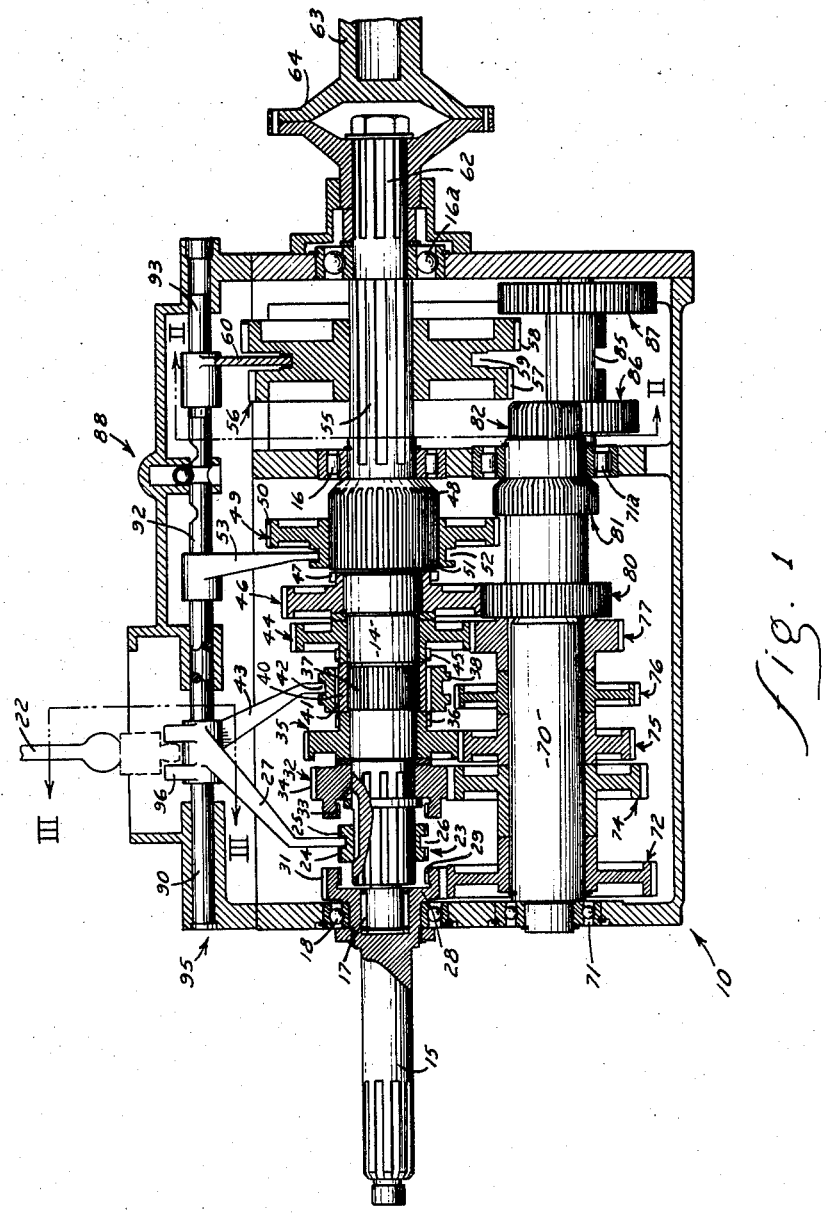
Figure 1 is a central, longitudinal, sectional view of a transmission assembly, including the present invention, taken along the line I—I of Figure 2 with parts thereof partially broken away.
Figure 4:
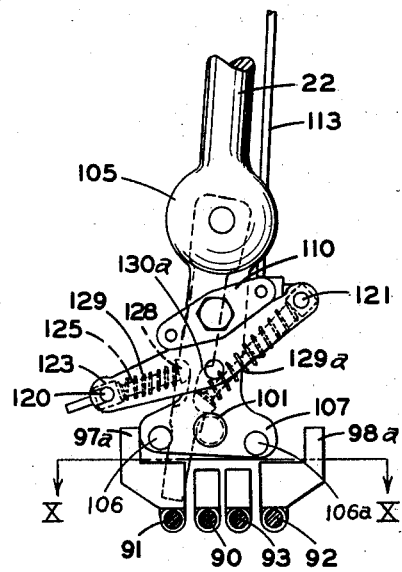
Figure 4 is a view similar to Figure 3, showing the semi-automatic actuator pin shifting device in its cocked position during a downshift operation.
Figure 5:
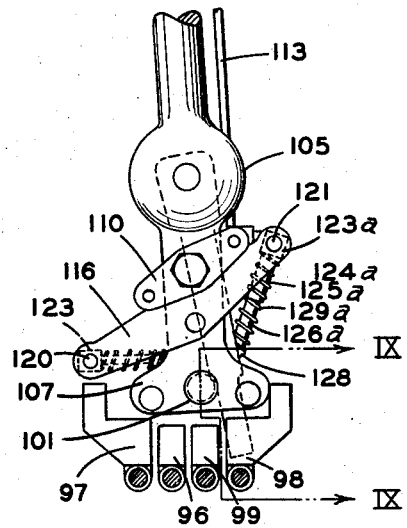
Figure 5 is a view similar to Figure 3, showing the actuator pin in its shifted position during a downshift operation.

A transmission embodying this invention includes a main transmission which is provided with gearing to furnish more ratios than can be conventionally handled by a single shift lever following a simple pattern. Normally, the invention will be found most useful with transmissions having seven or more forward speeds, but it may in some instances be desired for use with transmissions having six or even five forward speeds. The particular embodiment of the invention here utilized for illustrative purposes is provided with seven forward speeds.

In this embodiment, conventional shift rods are provided, each shift rod controlling in a known manner the gearing elements for one or two, usually two, of the gear ratios. The shift lever actuates the several shift rods in a manner which, instead of requiring a shift pattern which becomes rapidly more complicated as the number of gear ratios increases, remains relatively simple and easy to follow.

The mechanism by which this is carried out includes, first, a grouping of the shift rods into groups of such numbers of rods, preferably two rods in each group, that a single easy shift pattern can be established for carrying out a shifting sequence through each group individually and independently of the other groups, second, a mounting for the shift lever such that it is capable of movement through such pattern, and, third, mechanism under the control of the driver for connecting said shift lever to a selected one or another of said groups. Preferably, the said mechanism is preset by the driver prior to shifting out of the last ratio of a given group and automatically effects its movement from a position for engaging one group to a position for engaging another group upon attainment of a predetermined position, usually neutral, by the transmission.

*Detailed description*

The transmission box 10 is provided with a centrally disposed main shaft 14 and an input shaft 15, which shafts are preferably co-axial, with their adjacent ends closely spaced from each other within the transmission box 10. The main shaft 14 is rotatably supported upon bearings 16 and 16a within the transmission box 10, and the pilot bearing 17, said pilot bearing being mounted in and upon the adjacent end of the input shaft 15. The input shaft 15 is rotatably supported in one end of the transmission box 10 by means of the bearing 18. The leftward end of the input shaft 15 is splined for conventional coupling, usually through a clutch, with a power source, such as an internal combustion engine, and is supported by a clutch pilot bearing (not shown).

The leftward end portion of the main shaft 14 is splined for axially movable support of a first clutch member 23, which member has leftward and rightward sets of external teeth 24 and 25, respectively. The clutch member 23 is provided with a circumferential groove 26 between said teeth for engagement by a first clutch fork 27, which fork is actuable by a shift lever 22, as described in greater detail hereinbelow.

The rightward end of the input shaft 15 is provided with an input gear 28 having internal and external teeth 29 and 31, respectively. The internal teeth 29 of the input gear 28 are engageable with the leftward teeth 24 of the clutch member 23 when said clutch member is in its leftward position upon the splined portion of the main shaft 14.

A first floating gear 32, which is rotatably supported upon the main shaft 14 adjacent to the clutch member 23, is provided with external teeth 34 and with internal teeth 33 which latter are selectively engageable by the rightward teeth 25 of said clutch member.

A second floating gear 35 is rotatably supported upon the main shaft 14 adjacent the rightward side of said floating gear 32 and is provided with clutch teeth 36. The shaft 14 is formed with a second splined portion 37, upon which an externally and internally splined sleeve 40 is mounted. A second clutch member 38, having internal teeth 41, is supported upon, and has its teeth 41 engaged by, the external splining of sleeve 40 and is axially movable leftwardly and rightwardly with respect thereto. The clutch member 38 is provided with a circumferential groove 42 engageable by a second clutch fork 43, which clutch fork is actuable by means of the shift lever 22, as hereinafter described.

A third floating gear 44, having clutching teeth 45, is rotatably supported upon the main shaft 14 adjacent the rightward end of the spline 37.

A fourth floating gear 46 is rotatably supported upon the main shaft 14 adjacent the rightward side of floating gear 44 and is provided with clutch teeth 47. The main shaft is formed with an enlarged third spline portion 48 adjacent said clutch teeth 47. A ring gear 49, having external teeth 50, is provided with internal teeth 51 whereby said ring gear is supported upon and engaged by the splined portion 48 and is axially movable leftwardly and rightwardly with respect thereto. The ring gear 49 is provided with a circumferential groove 52 engageable by a third clutch fork 53 which clutch fork is actuable by means of the shift lever 22, as hereinafter described.

A fourth portion 55 of the main shaft 14 is splined in a conventional manner. A duplex ring gear 56 is disposed on the shaft intermediate the bearings 16 and 16a and has an internally splined, centrally disposed opening for support upon, and engagement with, the splined portion 55 of the main shaft 14. The duplex gear includes a first set of external gear teeth 57 defining a first, smaller poriton of said duplex gear and is provided with a second set of external teeth 58 defining a second, larger portion of said duplex gear. A groove 59 is provided intermediate the gears and receives a fourth clutch fork 60 actuable by the shift lever 22 in a manner to be described hereinafter. The gears 32, 35, 44, 46, 49, 57 and 58 are of progressively larger size and are provided with progressively greater numbers of external teeth for purposes which will become apparent as this description proceeds.

The rightward end 62 of the main shaft 14 is splined in a conventional manner and extends through the rightward end wall of the transmission box 10. The rightward end 62 of the main shaft 14 is adapted to engage any driven means, as a propeller shaft 63, by means of convenient, conventional coupling 64.

A countershaft 70 is rotatably supported within the transmission box 10, preferably directly below the main shaft 14 and parallel therewith, by the bearings 71 and 71a. A spur gear 72 is secured to the countershaft 70 adjacent the bearing 71 for continuous engagement with the external teeth 31 of the input gear 28. A second spur gear 74 is secured to the countershaft 70 and continuously engages the external teeth 34 of the first floating gear 32. A third spur gear 75 is secured to the countershaft adjacent the rightward side of the second spur gear 74 for continuous engagement with the external teeth of the second floating gear 35. A fourth spur gear 76 is secured to the countershaft 70 adjacent the rightward side of the gear 75. The fourth spur gear 76 drives the power take-off mechanism (not shown) of the transmission. A fifth spur gear 77 is secured to the countershaft and engages the external teeth of the third floating gear 44. A sixth spur gear 80 continuously engages the teeth of the fourth floating gear 46. A seventh spur gear 81 engages the external teeth 50 of the ring gear 49 when the ring gear is in its rightward position. The rightward end of the countershaft 70 is formed to provide a gear 82 for engagement with the teeth 57 on duplex gear 56 when the duplex gear is in its leftward position.

A reverse idler shaft 85 is secured within the transmission box 10 parallel with the countershaft 70 and is spaced substantially horizontally therefrom. A first reverse spur gear 86 (Figures 1 and 2) is rotatably mounted upon the reverse idler shaft 85 and is in constant engagement with the gear 82. A second reverse spur gear 87 is also rotatably mounted upon the reverse idler shaft, connected to the gear 86 for rotation therewith, and adapted to mesh with the teeth 58 on the duplex gear 56 when the duplex gear is in its rightward position.

The clutch forks 27, 43, 53 and 60 are connected to shift rods 90, 91, 92 and 93, respectively. An interlock mechanism 88, which may be of any conventional form, such as that disclosed in the aforementioned patent, is provided to insure that only one shift rod is moved out of neutral position at a time. Each of the shift rods is adapted to move the clutch fork associated therewith between two terminal positions in response to actuation by the shift lever 22. The shift rods, which are of conventional form, are supported in the housing 95 of the transmission box 10 and are provided with bifurcated, upstanding yokes 96, 97, 98 and 99 (Figure 3). An actuator pin 100 is received between the bifurcated yokes for operating a selected one of said shift rods. As most clearly shown in Figure 10, the middle yokes 96 and 99 are transversely open to permit the actuator pin 100 to pass therethrough and into the slots between the legs of the outer yokes 97 and 98 when all the yokes are in transverse alignment. When the yokes are so aligned the transmission is in neutral. The outer yokes 97 and 98 are provided with upstanding members 97a and 98a, respectively, having blocking surfaces 97b and 98b (Figure 10) to limit transverse movement of the actuator pin 100 in either direction.

The transmission described above has seven forward speeds and one reverse speed. To move any one shift rod, the actuator pin 100 must be fully engaged in the slot of the yoke attached to said rod. Thus, to place the transmission in first gear, the actuator pin 100 must be moved from its neutral position along a defined path which carries it transversely into full engagement with the yoke 99 and then longitudinally of the transmission in a leftward direction, as appearing in Figure 1 (upwardly in Figure 10). Longitudinal movement of yoke 99 in the opposite direction will place the transmission in reverse. Corresponding movement of yoke member 98 will place the transmission in second or third gear. Movement of yoke 97 places the transmission in fourth or fifth gear and movement of yoke 96 controls the sixth and seventh (direct drive) ratio of the transmission.

The invention provides a mechanism for reducing the number of required settings of the shift lever in the shift pattern of the disclosed transmission to some number of settings, as four, which can be handled by a simple shift pattern. To accomplish the eight possible shifts in the disclosed embodiment, the four possible movements of the shift lever are duplicated in two separate ranges, the first range covering reverse and first through third gears, while the second range covers fourth through seventh gears. With other transmissions employing other numbers of gear ratios, the two ranges may include fewer or greater numbers of possible shift lever movements. Alternatively, it is possible to split the number of available gear ratios into more than two groups. In such a construction, each of the groups, except possibly one group, would contain only two shift rods. Thus, for a transmission having ten available gear ratios, there would be two groups consisting of two shift rods and a third group consisting of one rod. For a transmission having twelve available gear ratios, it would be possible to use three groups of two shift rods or two groups of three shift rods, as desired. Where three shift rods in any group are used, it may be desirable to embody a conventional latching mechanism in a known manner to assist the driver in locating, and holding, a desired shifted position in any one such group.

To provide the dual range operation of the shift lever, it is necessary that the actuator 100 be preset to move from a position between one pair of shift rods into a position between the other pair of shift rods as soon as the transmission attains a neutral position after actuating the rods in the first pair. Thus, in the upshift operation of the transmission, the shift rods 93 and 92 will be actuated to move through the first, second and third gear settings. As the shift lever is moved to neutral from third gear the actuator pin 100 will, following manual preselection, automatically be moved to a position for engagement with shift rods 90 and 91 and is further upshifted to the desired level, preferably following the same shift pattern as was employed in the lower speed range.

While specific apparatus for controlling the actuator pin 100, or means equivalent thereto, may take many forms—pressure fluid, electrical or mechanical—two mechanical forms are herein presented to further illustrate the invention.

In one effective embodiment for effecting movement of the actuator pin 100, the shift lever 22 is formed with a spherical enlargement 105 (Figures 3, 4, 5 and 6) mounted in a suitable housing secured to the frame of the vehicle to provide a universal support for the lever. Legs 107 and 108 depend from the enlargement and extend to a position spaced somewhat above the upper edges of the yokes. The legs are adapted to be moved by the shift lever 22 longitudinally of the transmission between positions corresponding to the terminal positions of the shift rods, as well as transversely of the transmission in conjunction with the movement of actuator pin 100. The actuator pin 100 is located between the legs 107 and 108 and is mounted for pivotal movement with respect thereto by means of pivot pin 109. Bolts 106 and 106a limit such movement of the pin 100 and, incidentally, provide additional strength to the structure, including the legs 107 and 108. Levers 110 and 110a (Figures 3 and 6) are pivotally connected to the legs 107 and 108, respectively, by bolts 114. Bolts 111 and 112 extend between and secure the free ends of the levers 110 and 110a together. A cable 113, which is connected to a handle 118 placed in any suitable location convenient to the driver, such as on the shift lever 22, is connected to the bolt 112 by fixture 115. Upward and downward movement of the handle 118 causes vertical swinging movement of the levers 110 and 110a.

Levers 116 and 116a are pivotally mounted on the legs 107 and 108, respectively, below the levers 110 and 110a, by pins 119 and 119a. Pins 111 and 112 on levers 110 and 110a ride on tracks, of which one is shown at 117 in Figure 3, defined by the upper edges of the levers 116 and 116a. Pins 120 and 121 extend between the free ends of the levers 116 and 116a, respectively, and are pressed or otherwise fastened thereto for firmly securing them together.

A sleeve member 123 (Figure 4) having a recess 122 (Figure 6), and a tubular leg 125 extending out of said recess, is mounted upon the pin 120 for pivotal movement with respect thereto. A shoulder 124 is provided around leg 125 adjacent to member 123. A rod 126 (Figure 5) telescopes within the tubular leg 125 and is provided with an enlarged shoulder 127 (Figure 6) and a rounded head 128. Any suitable, resilient means, such as the coil spring 129 which surrounds the telescoping elements 125 and 126 between the shoulders 124 and 127, may be provided to urge said elements apart. The rounded head 128 is slidably disposed within a guideway 130 (Figure 3) in the side edge of the actuator pin 100, and the other end of said rod 126 may extend through the member 123.

A structure identical to that including the elements 123 to 130 described above is mounted on bolt 121 (Figure 3) and is identified by the same reference numerals with the suffix "a" applied thereto. This structure acts on the other side edge of actuator pin 100 in a guideway 130a.

The yoke members 97 and 98 are formed with upstanding blocking members 97a and 98a (Figures 3 and 10) which limit the extent of transverse movement of the shift lever 22, and legs 107 and 108, so that only two of the shift rods can be moved by the actuator pin 100 in either position of the actuator pin.

A spring urged detent device 101 (Figures 6 and 9) is mounted on leg 107 and is adapted to contact the side edges of the actuator pin 100. The detent device prevents accidental movement of the actuator pin 100 between the two groups of shift rods. The detent device includes a housing 102 mounted on leg 107. A coil spring is mounted within the housing and urges a ball 104 into engagement with the side edge of actuator pin 100. The ball will contact either side edge of the actuator pin 100 in the terminal positions thereof and will releasably hold the pin in such position.

Operation

Assuming that the transmission is being shifted upwardly from its neutral position, the actuator pin 100 will initially be placed into contact with the yoke 99 (Figures 3 and 10). The actuator pin 100 will then be removed longitudinally by suitable movement of the shift lever to move the shift rod 93 into the setting thereof for the first speed of the transmission. The actuator pin 100 will next be moved transversely into contact with yoke 98 and then longitudinally for placing the shift rod 92 in the setting for second and/or third speed. The upstanding member 98a will prevent too great a transverse movement of the pin and the detent device 101 will hold the pin in its extreme rightward position as appearing in Figures 9 and 10. At some time during the third speed setting of the transmission, the driver will depress the handle 118, thereby pivoting the legs 110 and 110a clockwise (Figure 3), thereby causing legs 116 and 116a to pivot clockwise to their positions where the rightward end thereof is lowermost. Such movement will cause telescoping of the members 125a and 126a and will cause compression of the spring 129a. This is the "cocked" position of the actuator pin shifting device. The spring 129a will urge the actuator pin 100 leftwardly but such movement will be blocked because the actuator pin 100 is held by the yoke 98 out of neutral position and therefore out of alignment with the slot in yoke 99. However, as soon as the yoke 98 returns to neutral at the end of the first range in the downshift sequence, the legs of all the yokes will be in alignment, providing a path for transverse movement of the pin 100. The actuator pin, under the urging of spring 129a, will then be forced leftwardly with a force sufficient to overcome the urging of detent spring 103 and will move into engagement with the yoke 97 on the shift rod 91 (Figure 3). The same pattern of longitudinal and transverse movements of the shift lever may now be repeated to obtain the fourth through seventh speeds of the transmission.

It is apparent that during the downshift progression, the movements of the shift lever are reversed. The cocking of the actuator pin shifting device will occur during the fourth speed operation of the transmission and will be caused by raising handle 118. The actuator pin shifting device will thereby assume the cocked position shown in Figure 4. As soon as all the yokes are in alignment the pin 100 will be forced rightwardly to the position shown in Figure 5. If operating conditions permit skipping of the third gear position of the transmission in the upshift progression or the fourth gear position in the downshift progression, the actuator pin shifting device may be cocked during the second and fifth gear positions, respectively.

Modifications

Figures 7, 8, 11, 12 and 13 show a further mechanical device for achieving the same functions as described above in connection with the pin 100 and the mechanism associated therewith. Here, the shift lever 22 is provided with a spherical enlargement 140 mountable in a suitable housing (not shown) to provide a universal support of the shift lever, as in the previously described embodiment. A base member 141 depends from the spherical enlargement 140 and includes at its lower end a pair of spaced legs 142 and 143 (Figure 12). A selector member 145 (Figures 12 and 13), here of inverted T-shape, is pivotally mounted by its stem between said legs on shaft 146, which shaft, as well shown in Figure 12, extends through and beyond the legs 142 and 143. The selector member 145 includes a pair of dogs 147 and 148 on the opposite ends of its crossbar portion. In this embodiment, two actuator pins 150 and 150a are provided and are pivotally mounted on the base member 141 by a bolt 144 secured by a safety nut 144a. Each actuator pin is mounted for engagement with two of the shift rods and each is provided with a recess, indicated at 149a in pin 150a and at 149 in pin 150 (Figure 13), for reception of one of the dogs so as to be locked for movement with the shift lever. The actuator pins are so spaced with respect to the several yokes that, with the lateral movement imparted by shift lever, each pin can engage either yoke in one pair of yokes. Thus, by lateral movement of the shift lever in one direction, the pins 150 and 150a will be simultaneously placed into engagement with the yokes 97 and 99, respectively, and by lateral movement of the shift lever in the other direction, the said pins will be simultaneously placed into engagement with the yokes 96 and 98. Upon longitudinal movement of the shift lever, one yoke or another will move in all cases, the particular yoke moving depending upon which of the pins 150 and 150a is locked to the base member 141 by the selector 145.

Figure 7:
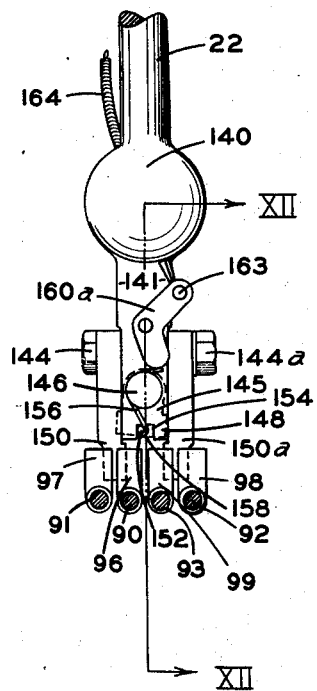
Figure 7 is a view similar to Figure 3, but showing a modified form for the shift rod actuating mechanism.
Figure 8:
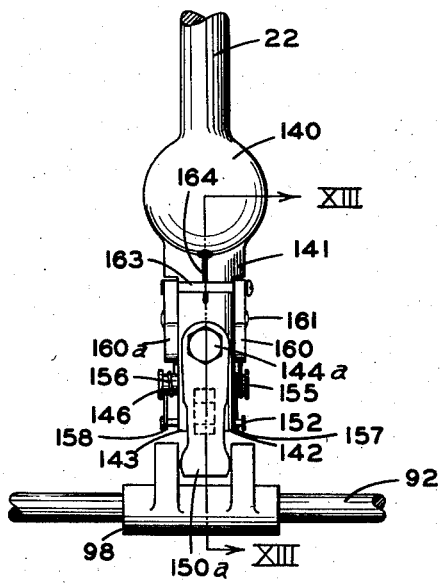
Figure 8 is a side elevation view of the mechanism shown in Figure 7.

A pin 152 is held in the low part of the selector 145 and extends from both sides to project through slots, of which one is shown in Figure 7 at 154, formed in each of the legs of the base member 141. A pair of coil springs 155 and 156 are mounted on the shaft 146 outwardly of the legs 142 and 143. The springs encircle, and are wound in opposite directions around, the shaft 146 and are provided with hook portions 157 and 158, which portions are hooked in opposite directions and contact opposite sides of the pin 152, shown in Figure 12. A pair of bell-crank levers 160 and 160a are pivotally mounted on base member 141 by the pivot pin 161. They are placed in opposite directions on said pin 161 and positioned so that their lower ends will bear alternately on the upper ends of the springs 155 and 156. Thus, counterclockwise movement of said levers (Figure 7) will cause lever 160a to assume the position shown in Figure 7 and bear against the upper end of spring 156, causing it to urge pin 152 toward actuator pin 150 while opposite movement of said levers will cause lever 160 (Figure 11) to move into position to bear against the upper end of spring 155 and cause it to urge pin 152 toward actuator pin 150a. The upper ends of the levers are connected together by a pin 163. A cable 164 is connected to pin 163 and is arranged to be actuated by the driver to cause pivotal movement of levers 160 and 160a.

In operation, during an upshift progression, actuator pin 150a will be engaged by dog 148 and will be locked for movement with the shift lever to effect the desired movements of shift rods 93 and 92. At this time, the actuator pin 150 is free to pivot relative to the shift lever. During the third speed operation in the upshift progression, cable 164 will be raised to cause counterclockwise pivotal movement of lever 160a (Figure 7). This imposes a pressure on the upper end of the spring 156 and releases a corresponding previous pressure by the lever 160 (Figure 11) on the upper end of the spring 155. Thus, this movement causes an urging of the selector member 145 leftwardly, as appearing in Figure 7. However, actual movement of the selector member is blocked as long as either of the shift rods 93 and 92 is not in neutral because the actuator pin 150 is out of line with the selector 145. As soon as the shift rods reach neutral and the actuator pins are aligned with each other and with the selector, movement of the selector member 145 will occur, and dog 147 will enter the corresponding recess in actuator pin 150. Actuator pin 150 will then be locked for movement with shift lever 22, while actuator pin 150a will be free to pivot relative to the shift lever. The shift lever is now connectible with the shift rods 90 and 91 and further upward shifting may then follow.

The downshift procedure and operation is the reverse of that above described for the upshift.

This structure has some advantages over that shown in Figures 3 to 6, inclusive, in that it is less complicated to build and to maintain and in that the changing of the shift lever connection from one group of rods to another group of rods is carried out by movement of a relatively small number of parts.

Although particular, preferred embodiments of our invention have been disclosed and described in detail hereinabove for illustrative purposes, it will be understood that modifications or variations thereof within the scope of said invention are fully contemplated unless specifically stated to the contrary in the appended claims.

We claim:

1. In a change speed transmission, the combination comprising: a first shaft; a second shaft; a plurality of sets of toothed elements mounted on said shafts, the toothed elements in each of said sets being selectively engageable to determine the speed ratio between said shafts; at least three shift rods, each of said shift rods being respectively connectible to the toothed elements in different sets of said toothed elements and adapted upon predetermined movement to cause a selected set of toothed elements to engage to obtain a predetermined speed ratio between said shafts, said shift rods being divided into at least two groups, at least one of said groups including at least two shift rods; a shift member adapted alternately to move the rods within one or another of said groups; a manually controllable means for engaging said shift member with one or another of said groups of shift rods at the will of an operator.

2. In a change speed transmission, the combination comprising: a first shaft; a second shaft; a plurality of sets of toothed elements mounted on said shafts, the toothed elements in each of said sets being selectively engageable to determine the speed ratio between said shafts; at least three shift rods, each of said shift rods being respectively connectible to the toothed elements in different sets of said toothed elements and adapted to cause a selected set of toothed elements to engage to obtain a predetermined speed ratio between said shafts, said shift rods being divided into at least two groups, at least one of said groups including at least two shift rods; a shift member movable through only a single shifting pattern, said pattern being applicable to each group of said rods for selectively moving the rods in each group through a selectable shifting sequence; a manually controllable, preselectable means for disengaging said shift member from one group of shift rods and engaging said shift member with another group of shift rods, said preselectable means being positionable while one of the shift rods of one group is in shifted position to cause a change of the engagement of said shift member from said one group to another, said change of engagement occurring automatically upon the reaching of neutral by the transmission whereupon at least a portion of said shifting pattern may be repeated for said another group of rods.

3. In a change speed transmission, the combination comprising: a first shaft; a second shaft; a plurality of sets of toothed elements mounted on said shafts, the toothed elements of each of said sets being selectively engageable to determine the speed ratio between said shafts; at least three shift rods, each of said shift rods being respectively connectible to at least one of the toothed elements in different sets of said toothed elements and adapted when shifted to cause a selected set of toothed elements to engage to obtain a predetermined speed ratio between said shafts, said shift rods being divided into at least two groups, at least one of said groups including at least two shift rods; a shift member movable through only a single shifting pattern, said pattern comprising the shifting movement required for shifting separately either group of said rods through a selected shifting sequence; means rendering said shifting member selectively and alternately connectible with one or another group of said shift rods; and manually controllable selecting means for determining the one of said groups to which said shift member is connected, said selecting means including means movable to a fixed, releasable condition while one of the shift rods of one of the groups is in shifted position, said last-named means when in said fixed condition urging said shift member from connection with said one group to connection with another group; and means for preventing said shift member from changing connection from the said one group to another until the shift rods are in neutral position whereupon said shift member automatically is connected to said another group.

4. The device defined in claim 3, wherein said manually controllable selecting means has a resilient member therein and said movable means is connected for compressing said resilient member when in said fixed condition, and other means actuated by said resilient member upon entry of said shifting member into its neutral position for effecting movement of said selecting means.

5. In a change speed transmission, the combination comprising: a first shaft; a second shaft; a plurality of sets of toothed elements mounted on said shafts, the toothed elements of each of said sets being selectively engageable to determine the speed ratio between said shafts; at least four shift rods, each of said shift rods being respectively connectible to at least one of the toothed elements in different sets of said toothed elements and adapted when shifted to cause a selected set of toothed elements to engage to obtain a predetermined speed ratio between said shafts, said shift rods being divided into at least two groups, at least one of said groups including two shift rods; a shift member movable longitudinally and transversely with respect to the shift rods of each group through only a single shifting pattern, said shift rods of each group being shiftable through a predetermined sequence by movement of said shift member through said pattern; means rendering said shift member selectively and alternately connectible with one selected group of said shift rods, said means being capable of changing said connection from one of said groups to another of said groups; and manually controllable selecting means for determining the one of said groups to which said shift member is connected, said selecting means being operable while the transmission is out of neutral and being movable between relatively fixed, but releasable, positions wherein it urges said shift member from connection with one group of rods to connection with another group of rods and means for preventing change of connection of said shift member from one of said groups to another until the transmission is in neutral.

6. The device defined in claim 5 wherein said manually controllable selecting means has a resilient member therein and means for compressing said resilient member when said selecting means is in one of said fixed positions, and other means actuated by said resilient member upon entry of said shifting member into its neutral position for effecting movement of said selecting means.

7. In a change speed transmission, the combination comprising: a first shaft; a second shaft; a plurality of sets of change speed gears mounted on said shafts, the gears in each of said sets being selectively meshable to determine the speed ratio between said shafts; at least three shift rods, each of said shift rods being connectible to the gears in different sets of said change speed gears and adapted upon predetermined movement to cause the gears in a selected gear set to mesh to obtain a predetermined speed ratio between said shafts, said shift rods being divided into at least two groups, at least one of said groups containing at least two shift rods each group controlling a portion of the entire range of the available speed ratios of the transmission; a shift member for engaging and selectively moving only the rods within any one or another of said groups in one sequence of movement thereof; a manually initiable means for automatically engaging said shift member with the rods in one or another of said groups at the will of an operator, said last-named means including a manually operable lever movable between relatively fixed positions and means responsive to the position of said lever for urging said shift member into engagement with one or another of said groups; and means for preventing change in the engagement of said shift member after a change in the position of said lever until the transmission next reaches neutral.

8. In a change speed transmission, the combination comprising: a main shaft; a countershaft; a plurality of sets of change speed gears mounted on said shafts, the gears in each of said sets being selectively meshable to determine the speed ratios between said shafts; at least four shift rods, each of said shift rods being connectible to gears in a pair of said sets of change speed gears, said shift rods being alternatively actuable to cause the gears of a selected gear set to mesh to obtain a predetermined speed ratio between said shafts, said shift rods being arranged in groups consisting of pairs of said rods, said rods in each group controlling a portion of the entire range of the available speed ratios of the transmission; a shift member for engaging and moving selectively only the pair of rods within any selected one of said groups in one sequence of movement of said member; manually controllable means for automatically engaging said shift member with the rods in one or another of said groups at the will of the operator.

9. In a change speed transmission, the combination comprising: a main shaft; a countershaft; a plurality of sets of change speed gears mounted on said shafts, the gears in each of said sets being meshable to determine the speed ratios between said shafts; a plurality of parallel shift rods, each of said shift rods being longitudinally movable so as to be capable of causing meshing of the gears of not more than two of said sets of change speed gears, said shift rods being alternatively actuable to cause a selected gear set to mesh to obtain a predetermined speed ratio between said shafts; said shift rods being divided into at least two groups, at least one of said groups including at least two shift rods, each group controlling a portion of the entire range of the transmission; a shift member adapted to engage each of said shift rods within any selected one of said groups and move the rods longitudinally in one sequence of movement thereof, said shift member being capable of establishing a connection with a selected group of shift rods when said rods are in position corresponding to the neutral condition of said transmission, said shift member being prevented from changing said connection in all other positions of shift rods; resilient means opposing said movement of said shift member between said groups of rods when said rods are in neutral position; manually controllable means for urging said shift member to move in a connection changing manner for effecting a change from a connection with the rods of one group to a connection with the rods of another group, said manually controllable means being actuable while said rods are in said other positions and continuously urging said shift member to move in a connection changing manner with a force sufficient to overcome said resilient means opposing said movement.

10. The combination of claim 9 wherein said manually controllable means includes compressible means acting on either side of the shift member and adapted to urge said shift member transversely when in a compressed condition.

11. The combination of claim 9 wherein said manually controllable means includes a pair of coil springs acting on both sides of said shift member, lever means connected to said coil springs and adapted to be pivoted between positions where one or the other of said coil spring is compressed; and manually controllable means for pivoting said lever means.

12. A transmission shifting construction, comprising in combination: a plurality of shift rods; a shift lever, a bifurcated portion on the lower end of said shift lever, an actuator pin between the legs of said bifurcated portion pivotally mounted on said shift lever, said actuator pin being adapted to contact said shift rods individually and move said rods longitudinally, said pivotal mounting of said actuator pin permitting transverse movement of said pin relative to said shift rods; a second lever pivotally connected to said legs of said bifurcated portion; two pairs of telescoping members, one telescoping member of each of said pairs being pivotally connected to the respective ends of said lever, the other telescoping member of each of said pairs contacting the respective side edges of said actuator pin; a coil spring surrounding each of said pairs of telescoping members and adapted to be compressed when said members are telescoped; a cocking lever pivotally mounted on said legs, said cocking lever acting upon said second lever and adapted to move it between a position where one or the other of said coil springs is compressed; and a manually operated cable connected to said cocking lever and adapted to pivotally move said locking lever to cause compression of one or the other of said springs.

13. In a change speed transmission, the combination comprising: a main shaft; a countershaft; a plurality of sets of change speed toothed elements on said shafts; the toothed elements on each of said sets being selectively meshable to determine the speed ratio between said shafts; a plurality of parallel shift rods, each of said shift rods being longitudinally movable so as to be capable of causing connection of the toothed elements of not more than two of said sets of change speed toothed elements, said shift rods being alternatively actuable to cause a selected set of toothed elements to mesh to obtain a predetermined speed ratio between said shafts; a shift member adapted to engage each of said shift rods and move the rods longitudinally; said shift member including a shift lever, a plurality of actuator pins mounted for pivotal movement with respect to said shift lever, each actuator pin acting upon and adapted to individually move at least two of said shift rods longitudinally; selector means alternatively engageable with said actuator pins and adapted to prevent pivotal movement of a selected one of said actuator pins relative to said shift lever; manually controlled means for moving said selector member into engagement with one or the other of said actuator pins.

14. The device defined in claim 13 wherein said last named means is manually preselectable and is automatically actuated upon entry by said shifting member into its neutral position.

15. In a change speed transmission, the combination comprising: a main shaft; a countershaft; a plurality of sets of change speed toothed elements on said shafts, the toothed elements on each of said sets being selectively meshable to determine the speed ratio between said shafts; a plurality of parallel shift rods, each of said shift rods being longitudinally movable so as to be capable of causing connection of the toothed elements of no more than two of said sets of change speed toothed elements, said shift rods being alternatively actuable to cause a selected set of toothed elements to mesh to obtain a predetermined speed ratio between said shafts; a shift member adapted to engage each of said shift rods and move the rods longitudinally, said shift member including a shift lever, a plurality of actuator pins pivotally mounted on and arranged for lateral movement by said shift lever, said pins being so arranged and spaced with respect to said shift rods that in one position of said shift lever said pins simultaneously and respectively engage one shift rod of each of said groups of said shift rods and in another position of said shift lever said pins simultaneously and respectively engage another shift rod of each of said groups of shift rods; selector means alternately connecting one of said pins for movement with and by said shift lever; manually controllable means for actuating said selector means.

16. The device defined in claim 15 wherein said last named means is manually preselectable and is automatically actuated upon entry by said shifting member into its neutral position.

17. The device defined in claim 13 wherein said manually controlled means includes a pair of resilient members each connected independently to said selector; a pair of pressure devices arranged for simultaneous movement with respect to said shift lever and so related to said resilient members that movement in one direction engages one of said resilient members in the manner for urging said selector in one selecting direction and movement of said engaging means in the opposite direction engages the other resilient means and causes it to resiliently urge the selector in the other selecting direction; and a manually controllable device for moving said engaging means in one direction or the other at the will of an operator; whereby movement of said last named device when said transmission is in a shifted position will place a resilient pressure upon said selecting device for effecting a change in selection and a return of said transmission to its neutral position will permit said selector to move in response to said resilient means and change the connection of said shift lever from one pin to the other pin and thereby change the connection of said shift lever from one group of shift rods to another group of shift rods.

18. In a change speed transmission, the combination comprising: a first shaft; a second shaft; a plurality of sets of toothed elements mounted on said shafts, the toothed elements in each of said sets being selectively engageable to determine the speed ratio between said shafts; at least three shift rods, each of said shift rods being respectively connectible to the toothed elements in different sets of toothed elements and adapted, upon predetermined movement, to cause a selected set of toothed elements to engage to obtain a predetermined speed ratio between said shafts, said shift rods being divided into at least two groups, at least one of said groups including at least two shift rods: a shift member for selectively moving rods within both of said groups; and limiting means for limiting movement of the shift member to actuation of only the shift rods in one group at a time, said shift member being capable, despite said limiting means, of engaging either of said groups when and as required for effecting a designated shifting sequence.

19. A change speed transmission shifting structure, comprising: at least three shift rods; shifting means for selectively actuating said shift rods; means limiting said shifting means to movement for actuating a group consisting of less than the entire number of said shift rods during a shifting sequence; and means for rendering said limiting means ineffective so that said shifting means may be placed in a position for actuating shift rods other than those in said group, said limiting means thereupon preventing said shifting means from engaging the shift rods in said group.

20. A change speed transmission shifting structure, comprising: at least three elongated, substantially parallel, shift rods; shifting means selectively engageable with said shift rods, said shifting means being movable through a shifting pattern which includes movement transversely of said shift rods and movement longitudinally thereof, whereby said shifting means may be selectively moved longitudinally to cause longitudinal movement of said one shift rod; blocking means limiting transverse movement of said shifting means so that said shifting means can engage a group consisting of only two of said shift rods during a given shifting pattern thereof; and means for overcoming the effect of said blocking means and for positioning said shifting means for engaging others of said shift rods, said blocking means thereafter blocking said shifting means from engaging the shift rods in said group, whereby said shifting pattern may be repeated at least in part for others of said rods.

21. In a change speed transmission, the combination comprising: a first shaft; a second shaft; a plurality of sets of toothed elements mounted on said shafts, the toothed elements in each of said sets being selectively engageable to determine the speed ratio between said shafts; at least three shift rods, each of said shift rods being respectively connectible to the toothed elements in different sets of toothed elements and adapted, upon predetermined movement, to cause a selected set of toothed elements to engage to obtain a predetermined speed ratio between said shafts, said shift rods being divided into at least two groups, at least one of said groups including at least two shift rods; a shift member for selectively moving rods within one or another of said groups; means limiting movement of the shift member to actuation of only the shift rods in one group at a time; and means for moving said shift member from a position for actuating the rods in one group to a position for actuating a rod in another group.

22. In a change speed transmission, the combination comprising: a first shaft; a second shaft; a plurality of sets of gears mounted on said shaft, the gears in each of the respective sets being selectively engageable to determine the speed ratio between said shafts; a plurality of shift rods connected for causing engagement of the gears of said sets, said shift rods being divided into at least two groups, at least one of said groups including at least two shift rods; and a shift member for actuating said rods, said shift member being movable to one position and therein further movable through a pattern which includes actuation of only the shift rods within one of the groups, and said shift member being also movable to another position where the shift pattern may be repeated on another group of shift rods.

23. In a change speed transmission having at least three shift rods arranged in at least two groups, each shift rod being movable to effect a selected driving connection between the input and output shafts of said transmission and thereby effecting a selected speed ratio between said shafts, the combination comprising: a shift lever having an end portion movable with respect to the remainder of the lever into a number of operating positions at least equal to the number of said groups, said end portion being arranged with respect to said shift rods so that in each respective one of its operating positions it will engage the shift rods of a selected one of said groups, for moving same, one at a time, in response to movement of the remainder of said lever; and preselectable means mounted upon said lever and movable between fixed positions, said preselectable means when in its respective positions urging said end portion from one of its operating positions to another for selecting the operating position of said end portion with respect to the remainder of said lever, and means for blocking movement of said end portion from one of its operating positions to another until said shift rods are in neutral whereby said end portion may be disassociated from one group of shift rods and operably associated with another group of shift rods.

24. In a change speed transmission having at least three shift rods arranged in at least two groups, each shift rod being movable for effecting a selected driving connection between the input and output shafts of said transmission and thereby effecting a selected speed ratio between said shafts, the combination comprising: a shift lever mounted for movement longitudinally and transversely of the shift rods and having an end portion arranged for moving the shift rods, one at a time, in a selected one of said groups in response to movement of said lever in a predetermined shift pattern; and preselectable means mounted upon, and movable with, said lever, said preselectable means being manually movable between fixed positions wherein it urges said end portion from one group of shift rods toward another group for disassociating said end portion from operation with one group of said shift rods and operably associating said end portion with another group of said shift rods; means for blocking movement of said end portion from one group of shift rods to another group until said shift rods are in neutral, the said shift pattern of said lever being, at least in part, substantially the same for both groups of said rods.

25. The structure of claim 24 wherein said shift rods have substantially parallel axes of movement, said end portion is movable with respect to the remainder of said lever in a direction substantially transverse of said shift rods, and said preselectable means supported upon said lever, after preselection into one of its fixed positions, automatically effects movement of said end portion in said direction of movement thereof when the shift rods next reach neutral.

26. The structure of claim 24 wherein said end portion includes a plurality of elements pivotally supported upon the said remainder of said lever, each one of said elements being continuously engaged with one of said shift rods for movement thereof, and said preselectable means supported upon said lever selectively holds one of said elements at a time in a non-movable position with respect to said remainder of said lever.

27. In a change speed transmission having a plurality of substantially parallel shift rods arranged in at least two groups, at least one group containing at least two shift rods, each rod being axially movable for effecting a change in the speed ratio of said transmission, the combination comprising: a shift member and means supporting said member for movement substantially in a direction parallel with the direction of movement of said shift rods and a direction transverse to said direction of movement, said member having an end portion arranged for moving the shift rods within one of said groups, one at a time, in response to movement of the remainder of said member; and selecting means supported upon said member for disassociating said end portion from operation with one of said groups and operably associating said end portion with another one of said groups, said remainder of said shift member operating in said parallel and transverse directions for shifting the rods within the respective groups.

28. In a change speed transmission having a plurality of substantially parallel shift rods, each rod being axially movable for effecting a change in the speed ratio of a transmission, the combination comprising: a shift device having a first part and a second part, and connecting means effecting movement of said second part in response to movement of said first part; means supporting at least said second part for movement in a direction substantially parallel to the direction of movement of said shift rods, said second part having shift rod engaging means arranged for engaging said shift rods, one at a time, and moving an engaged rod in response to movement of said second part; and preselectable means manually operable from at least adjacent said first part and movable between fixed positions, said preselectable means when in its respective positions urging said shift rod engaging means from association with one of said rods into association with another of said rods for disassociating said shift rod engaging means from operation of one of said shift rods and operably associating said shift rod engaging means with another one of said shift rods, means for preventing change of association of said shift rod engaging means from one rod to another until said rods are in a predetermined position with respect to each other, said first part operating in the same plane of movement for shifting each of said two last named rods.

29. In a change speed transmission having at least three shift rods arranged in at least two groups, each shift rod being movable to effect a selected driving connection between the input and output shafts of said transmission and thereby effecting a selected speed ratio between said shafts, the combination comprising: a shift device having a rod engaging portion and a manually engageable portion, said rod engaging portion being movable with respect to the manually engageable portion into a number of operating positions at least equal to the number of said groups, said rod engaging portion being arranged with respect to said shift rods so that in each respective one of its operating positions it will engage the shift rods in one, and only one, of said groups for moving same, one at a time, in response to movement of the manually engageable portion; and means mounted at least adjacent said manually engageable portion for selecting the operating position of said rod engaging portion, whereby said rod engaging portion may be disassociated from one group of shift rods and operably associated with another group of shift rods, with the manually engageable portion following, at least in part, the same shift pattern for each position of said rod engaging portion.

References Cited in the file of this patent

UNITED STATES PATENTS

| 2,316,503 | Curtis | Apr. 13, 1943 |
| 2,800,033 | Zittrell | July 23, 1957 |

FOREIGN PATENTS

| 456,874 | Germany | Feb. 13, 1927 |